US011346685B2

(12) United States Patent
Goluguri

(10) Patent No.: US 11,346,685 B2
(45) Date of Patent: May 31, 2022

(54) PARKING EXIT COORDINATION SYSTEMS AND METHODS

(71) Applicant: Toyota Motor North America, Inc., Plano, TX (US)

(72) Inventor: Jaya Bharath R. Goluguri, McKinney, TX (US)

(73) Assignee: TOYOTA MOTOR NORTH AMERICA, INC., Plano, TX (US)

(*) Notice: Subject to any disclaimer, the term of this patent is extended or adjusted under 35 U.S.C. 154(b) by 237 days.

(21) Appl. No.: 16/185,431

(22) Filed: Nov. 9, 2018

(65) Prior Publication Data

US 2020/0149917 A1 May 14, 2020

(51) Int. Cl.
*G01C 21/36* (2006.01)
*H04W 4/44* (2018.01)
*H04W 4/46* (2018.01)

(52) U.S. Cl.
CPC .......... *G01C 21/3691* (2013.01); *H04W 4/44* (2018.02); *H04W 4/46* (2018.02)

(58) Field of Classification Search
None
See application file for complete search history.

(56) References Cited

U.S. PATENT DOCUMENTS

| | | |
|---|---|---|
| 7,395,149 B2 | 7/2008 | Shuichi et al. |
| 9,786,169 B2 | 10/2017 | Toshio et al. |
| 10,269,250 B2 * | 4/2019 | Altinger ................ E04H 6/422 |
| 2002/0171562 A1 * | 11/2002 | Muraki .................. G08G 1/14 340/932.2 |
| 2007/0021907 A1 * | 1/2007 | Kato ..................... G01C 21/206 701/408 |
| 2009/0271102 A1 * | 10/2009 | Inoguchi .............. G08G 1/0962 701/118 |
| 2010/0121567 A1 * | 5/2010 | Mendelson ........ G06Q 30/0239 701/467 |
| 2017/0212511 A1 | 7/2017 | Celestino et al. |
| 2018/0045535 A1 * | 2/2018 | Kim ..................... G06K 9/3258 |
| 2018/0052860 A1 * | 2/2018 | Hayes ................... G07B 15/02 |
| 2018/0262888 A1 * | 9/2018 | Macneille ............... H04W 4/46 |

(Continued)

FOREIGN PATENT DOCUMENTS

| | | | | |
|---|---|---|---|---|
| CN | 104835325 B | * | 1/2017 | |
| JP | 2002168642 A | * | 6/2002 | |

(Continued)

*Primary Examiner* — Genna M Mott
(74) *Attorney, Agent, or Firm* — Dinsmore & Shohl LLP

(57) ABSTRACT

A system for determining a direction of a vehicle relative to an exit gate of a parking structure includes a vehicle location detector, one or more processors, one or more memories communicatively coupled to the one or more processors and storing one or more maps of one or more parking structures, machine readable instructions stored in the one or more memory, and a communication unit configured to exchange one or more data streams over a network. The machine readable instructions performs at least (i) receiving location information of a target vehicle from the vehicle location detector, (ii) determining a current location of the target vehicle in the target parking structure, (iii) applying a predetermined set of rules to determine an optimal exit gate of the target parking structure, and (iv) outputting the optimal exit gate on a display screen.

20 Claims, 6 Drawing Sheets

(56) References Cited

U.S. PATENT DOCUMENTS

| | | | | |
|---|---|---|---|---|
| 2019/0129412 A1* | 2/2019 | Kim | ............................ | G05D 1/00 |
| 2019/0170522 A1* | 6/2019 | Matsunaga | ........ | G08G 1/096844 |
| 2019/0193725 A1* | 6/2019 | Suzuki | .................. | B60W 30/06 |
| 2019/0353493 A1* | 11/2019 | Takahashi | ............. | G01C 21/365 |
| 2019/0389463 A1* | 12/2019 | Mizutani | ................... | G08G 1/14 |
| | | | | 340/932.2 |
| 2020/0041299 A1* | 2/2020 | Kato | ................... | G06Q 30/0239 |
| | | | | 701/467 |
| 2020/0120273 A1* | 4/2020 | Kazuyuki | ............... | H04N 5/272 |
| 2020/0302193 A1* | 9/2020 | Nagata | .................. | B60W 30/09 |

FOREIGN PATENT DOCUMENTS

| | | | |
|---|---|---|---|
| JP | 2009289174 A | | 12/2009 |
| JP | 4760794 B2 | | 8/2011 |
| JP | 2012193513 A | * | 10/2012 |
| WO | 2016174670 A1 | | 11/2016 |
| WO | 2017176550 A1 | | 10/2017 |

* cited by examiner

PARKING EXIT COORDINATION SYSTEMS AND METHODS

TECHNICAL FIELD

Embodiments described herein generally relate to parking exit coordination systems and methods and, more specifically, to parking exit coordination systems and methods for coordinating traffic of vehicles exiting a parking structure around the same time by guiding vehicles to find an optimal gate and exit the parking structure based on a determined sequence in an orderly manner.

BACKGROUND

Vehicle drivers frequently encounter other vehicles seeking to park in a parking structure. Events attracting a large crowd are typically associated with parking arrangements in which a large number of vehicles arrive and leave around the same time. In order to accommodate a large number of vehicles, parking structures tend to have multiple levels and have complicated structures to maximize parking capacity. When drivers park in a large open parking lot, drivers often have a difficult time locating an exit. In order to find a parking exit gate in an indoor parking structure, or a large outdoor parking lot, drivers primarily rely on exit signs. It is not uncommon for drivers to become confused when exiting a parking structure, leading to frustration and loss of time.

Another frustrating and time-consuming aspect of the parking experience arises when a large number of vehicles attempt to exit a parking structure around the same time after a sporting event, a conference, etc. It is quite frustrating for drivers to deal with the uncertainty of traffic flow when a large number of vehicles are simultaneously departing from the same exit gate.

To avoid the inconvenience and burden when leaving events that attract a large crowd, drivers may decide to avoid attending such events. Even if drivers attend the events, the frustration and inconvenience from exiting a parking structure may unfavorably affect any memory of the event. Moreover, due to the significant and unexpected delay in exiting the parking structure, drivers' schedules may be undesirably delayed and road traffic conditions can unexpectedly deteriorate. Accordingly, there is a need to provide parking exit coordination systems and methods to coordinate organized parking movement, remove collision risks and improve drivers' experience.

SUMMARY

In one embodiment, a system for determining a direction of a vehicle relative to an exit gate of a parking structure includes a vehicle location detector, one or more processors, one or more memories communicatively coupled to the one or more processors and storing one or more maps of one or more parking structures, a first set of machine readable instructions stored in the one or more memories, and a communication unit configured to exchange one or more data streams over a network. The first set of machine readable instructions, upon execution by the one or more processors, perform at least (i) receiving location information of a target vehicle from the vehicle location detector, (ii) determining a current location of the target vehicle in the target parking structure, (iii) applying a predetermined set of rules to determine an optimal exit gate of the target parking structure, and (iv) outputting the optimal exit gate on a display screen.

In another embodiment, a system for determining motion of a vehicle relative to an exit gate of a structure includes a first group of sensors mounted on a target vehicle, a second group of sensors mounted on a target structure, a communication device mounted on the target vehicle and enabled with vehicle-to-vehicle (V2V) communication settings, vehicle-to-infrastructure (V2I) communication settings, vehicle-to-cloud (V2C) communication settings, or a combination thereof and a memory. The memory stores downloadable map data indicative of location coordinates of the target structure, computer code for correlating the location coordinates and a vehicle traffic state within the target structure with an orientation and a direction of the target vehicle relative to one or more exit gates of the target structure, and one or more processors. The one or more processors are adapted to receive signals from the first group of sensors and the second group of sensors, retrieve the location coordinates of the target structure, and execute the computer code. The one or more processors are configured to determine a current location of the target vehicle in the target structure, determine the orientation and direction of the target vehicle relative to one or more exit gates of the target structure; and select and output an optimal exit gate among the one or more exit gates.

In another embodiment, a method for determining the motion of a vehicle relative to a closed structure includes steps of retrieving map data indicative of location coordinates of a target structure, correlating the location coordinates and a traffic state within the target structure with an orientation and a direction of a target vehicle, determining a current location of the target vehicle in the target structure, determining the orientation and direction of the target vehicle relative to one or more exit gates of the target structure, and selecting and outputting an optimal exit gate among the one or more exit gates.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
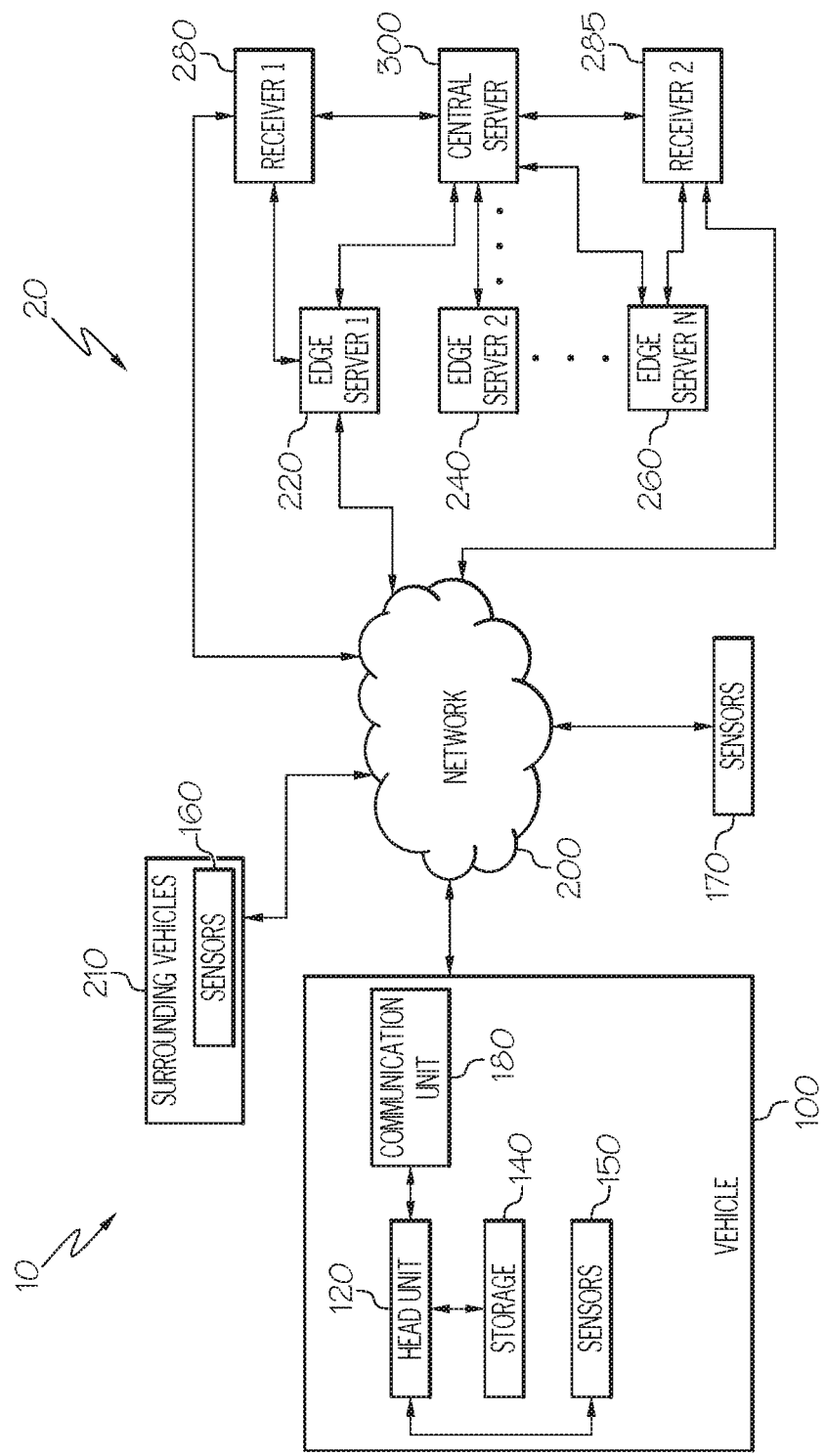
FIG. 1 schematically depicts a connected car system.

Connected cars are equipped to communicate with other devices, utilizing connectivity available via wireless and/or cellular networks. Connected cars may be connected to and communicate with the surroundings. Connected cars may communicate via a variety of communication models, including Vehicle to Infrastructure ("V2I"), Vehicle to Vehicle ("V2V"), Vehicle to Cloud ("V2C"), and Vehicle to Everything ("V2X") communication models. A V2I communication model facilitates the communication between a vehicle and one or more infrastructure devices, which may enable the exchange of data generated by a vehicle and information about the infrastructure. A V2V communication model facilitates the communication between vehicles and may allow for the exchange of data generated by surrounding vehicles, including speed and position information of surrounding vehicles. A V2C communication model facilitates the exchange of information between a vehicle and a cloud system. A V2X communication model interconnects all types of vehicles and infrastructure systems with another.

As discussed above, connected cars operate to capture and generate a large amount of data about a vehicle, surrounding vehicles, the environment, etc. Connected cars seamlessly transmit such data to surrounding vehicles, a cloud server, other infrastructure, etc. and communicate with them via the network. The embodiments disclosed herein include systems and methods for coordinating parking exit from a parking structure. Vehicles disclosed herein may include connected cars. Although there may be differences in terms of the degree of functionality implemented with vehicles, the network connectivity may be provided to the extent that data will be exchanged between vehicles and a remote server such as a cloud server. The operation conditions of vehicles may be obtained and determined based on data from on-board sensors and other sensors and transmitted using the network connectivity.

In some embodiments, the systems and methods include vehicles enabled with V2V communication capability. Communication through a V2V network is used to coordinate vehicle departure movements from a parking structure or a parking lot. In some embodiments, a rule-based optimization algorithm is used to determine and coordinate vehicle departure movements. In other embodiments, the systems and methods disclosed herein may be used even in situations where vehicles do not have up-to-date connectivity.

In the embodiments disclosed herein, a parking exit coordination system includes a processor, a memory for storing a predetermined program and an indoor parking map, a communication module, and a vehicle location detector. The program, upon execution by the processor, optimizes and coordinates exiting of vehicles from a parking structure based on proximity of vehicles to the exit gate and the location of vehicles in the parking structure. The program also considers local optimization factors, such as when particular parking structure requires exiting of one vehicle first and the other vehicle later even though the other vehicle is proximate to the exit due to turning lanes, blocking structures, etc. The various systems and methods for coordinating parking exit of vehicles will be described in more detail herein with specific reference to the corresponding drawings.

FIG. 1 schematically depicts a connected cars system 10 including a vehicle 100 and a cloud computing system 20. The vehicle 100 includes a head unit 120, storage 140 and various sensors 150. The head unit 120 controls operation of the vehicle 100 based on data points captured and sent from the sensors 150. The storage 140 is coupled to the head unit 120 and stores a set of data points under the control of the head unit 120. The sensors 150 include various types of sensors used in the vehicle 100. In some embodiments, the sensors 150 include one or more cameras, an accelerometer, a proximity sensor, a braking sensor, a motion sensor, etc. However, the sensors 150 used in the vehicle 100 may not be limited thereto and other sensors can be implemented.

In some embodiments, the vehicle 100 also receives data points from other sensors 170 that may be arranged outside of the vehicle 100. For example, the sensors 170 may be arranged on or near buildings such as a parking structure, municipal infrastructure, the surroundings of the vehicle 100, etc. The vehicle 100 may receive data points from the sensors 170 via the network 200. In other embodiments, the vehicle 100 may receive the data points from surrounding vehicles 210 via a V2V communication channel. Like the sensors 150, various types of sensors such as one or more cameras, an accelerometer, a proximity sensor, a braking sensor, a motion sensor, etc. may be used as the sensors 170.

As shown in FIG. 1, the vehicle 100 includes a communication unit 180 that exchanges data and information between the vehicle 100 and a network 200. As shown in FIG. 1, the vehicle 100 may be connected and communicate with one or more edge servers 220, 240 and 260. The edge servers 220, 240 and 260 may be connected and communicate with a central server 300. The central server 300 may be in communication with receivers 280, 285. Receivers such as Receiver 1 280 and Receiver 2 285 may receive data streams from vehicles and transmit the received data streams to the central server 300, or vice versa.

Figure 2:
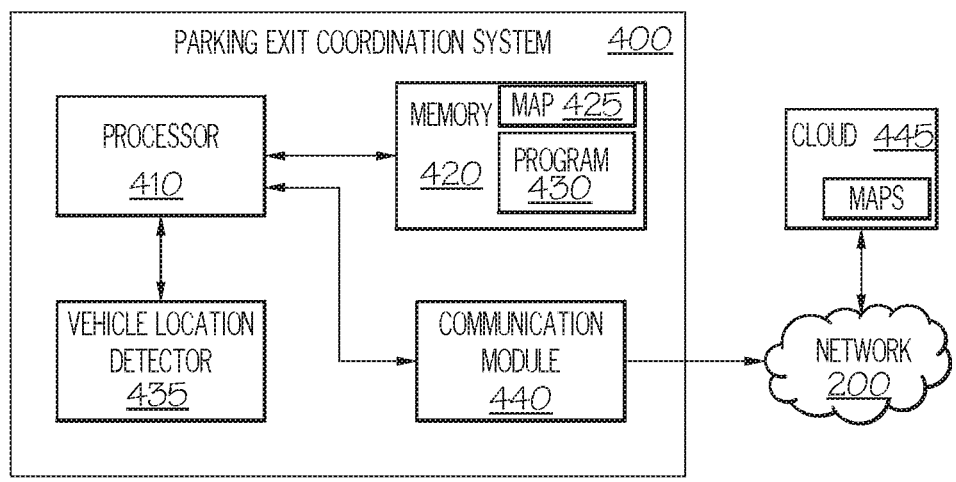
FIG. 2 schematically depicts a parking exit coordinating system according to one or more embodiments shown and described herein.

FIG. 2 schematically depicts a parking exit coordination system 400 according to one or more embodiments shown and described herein. As shown in FIG. 2, the parking exit coordination system 400 includes a processor 410, a memory 420, a vehicle location detector 435 and a communication module 440. The processor 410 is coupled to the memory 420 that stores a parking exit coordination program that will be described in detail below. The memory 420 also stores a map of a parking structure. In some embodiments, the parking exit coordination system 400 may download maps 425 of various parking structures form a cloud server 445 that stores maps over the network 200. The cloud server 445 stores maps of various parking structures to provide to the parking exit coordination system 400 upon request. In some embodiments, the parking exit coordination system 400 may send a request for a map based on an address of a parking facility. In other embodiments, parking facilities may be associated with identification numbers and the parking exit coordination system 400 may provide an identification number of a parking facility to the cloud server 445 for requesting a relevant map.

The parking exit coordination system 400 further includes a vehicle location detector 435. In some embodiments, the vehicle location detector 435 includes a GPS device that determines accurate coordinate information of a parking structure or facility. Additionally, or alternatively, the vehicle location detector 435 further includes a parking location reference point locator. In parking facilities, GPS signals may be unavailable due to blocking structures within the parking facilities. The parking location reference point locator enables vehicles to determine the location within parking facilities, regardless of availability of GPS signals.

In some embodiments, the parking location reference point locator may include a sensing system that determines the location of a vehicle. For instance, in some embodiments, the sensing system includes a ground sensor assigned to and arranged with each parking space. The ground sensor includes information indicative of a floor level and a specific location of the parking space. The sensing system may include a camera or a proximity sensor that captures images or a location indicator. As another example, the parking location reference point locator may include a parking beacon.

Referring to FIG. 2, the parking exit coordination system 400 includes the communication module 440 that facilitates communication with the cloud server 445 over the network 200. Additionally, or alternatively, the parking exit coordination system 400 facilitates communication with surrounding vehicles and parking infrastructures. In some embodiments, the communication module 440 accommodates V2V enabled communications, V2I enabled communications, and V2C enabled communication. In some embodiments, the communication module 440 accommodates cellular communication, wireless communication, etc.

Figure 3:
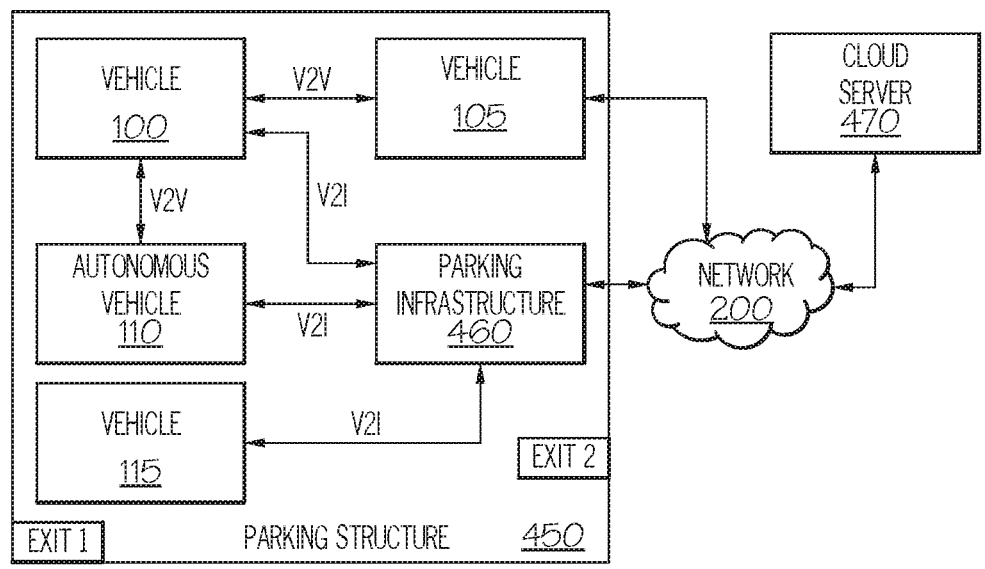
FIG. 3 schematically depicts implementation of a parking exit coordinating system in various settings according to one or more embodiments shown and described herein.

FIG. 3 schematically depicts the implementation of the parking exit coordination system 400 in various settings according to one or more embodiments shown and described herein. FIG. 3 depicts an exemplary parking structure 450 that can be an indoor or an outdoor parking facility. The parking facility includes multiple exit gates such as EXIT 1 and EXIT 2 at different locations and/or different floor levels. The parking structure 450 as shown in FIG. 3 is by way of example only and a parking structure for use with the embodiments described here is not limited to the structure shown in FIG. 3.

In one embodiment, the parking exit coordination system 400 may involve vehicle 100 and vehicle 105 that perform the V2V communication. Thus, vehicles 100 and 105 may include V2V enabled communication functionality. In order to perform the V2V communication, the vehicles 100 and 105 may be within a certain distance range and perform point-to-point communication. In some embodiments, the vehicle 100 is in communication with an autonomous vehicle 110 included in the parking exit coordination system 400. In other embodiments, the parking exit coordination system 400 is in connection with a vehicle 115 that may not be V2V enabled such that the vehicle 115 may not be able to directly communicate with the vehicle 100 and the autonomous vehicle 110.

In some embodiments, a parking infrastructure system 460 includes a computing system having a central processor, a memory and storage. The parking infrastructure system 460 may be included within the parking structure 450. The parking infrastructure system 460 also includes various sensing systems. The parking infrastructure system 460 also includes a communication device that enables communication with various vehicles 100, 105, 110 and 115 and a cloud server 470 over the network 200. As discussed above, the vehicle 115 is not enabled for V2V communication and may communicate with the parking infrastructure system 460 via V2I communication. Additionally, or alternatively, the vehicle 115 may communicate with the cloud server 470 over the network 200 via V2C communication.

The memory of the parking infrastructure system 460 stores a predetermined program that accommodates parking exit coordination to the extent that is required. The parking infrastructure system 460 provides relevant information and executes the predetermined program to perform necessary coordination with vehicles 100, 105, 110 and 115. In some embodiments, the parking infrastructure system 460 may operate to provide the location information of the vehicle 115. In other embodiments, the parking infrastructure system 460 may operate to provide a determined turn of exiting a parking gate by vehicles positioned around the same parking gate. In another embodiment, the parking infrastructure system 460 may operate to provide a vehicle traffic status in connection with a particular exit gate of the parking facility. Operations of the parking infrastructure system 460 will be described more in detail.

Figure 4:
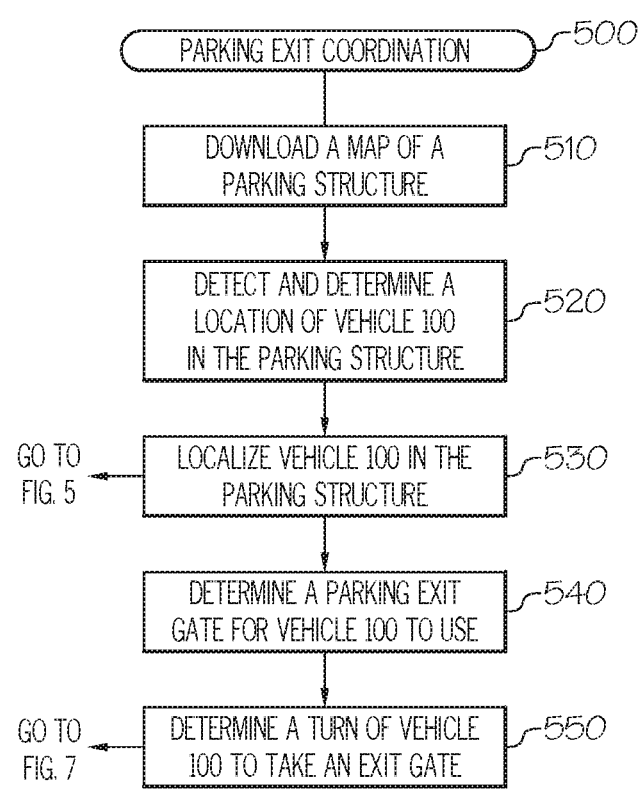
FIG. 4 depicts a flow chart of a parking exit coordination method according to one or more embodiments shown and described herein.

FIG. 4 depicts a flow chart of a parking exit coordination method 500 according to one or more embodiments shown and described herein. When drivers plan to leave a parking structure, drivers may start activating a navigation guide. In order to use the parking exit coordination method 500, drivers may start activating a parking exit coordination service. In some embodiments, the parking exit coordination service may be subscription-based. Drivers having subscription to the parking exit coordination service may run an application by activating a service icon, or selecting a menu corresponding to the parking exit coordination service.

Once the parking exit coordination service is activated, vehicles may download a map of the parking structure from the cloud server 445 (Step 510), as shown in FIG. 2. For convenience of explanation, the vehicle 100 (shown in FIG. 1) is used as a vehicle planning to exit the parking structure. The vehicle 100 may send a request for a map to the cloud server 445 which stores various maps of different parking structures. The vehicle 100 may provide as an input an address of the parking structure, or an identification number of the parking structure in order to identify a relevant map. In response to the request, the cloud server 445 identifies a relevant map among the maps stored therein and sends the relevant map to the parking exit coordination system 400 arranged in the vehicle 100. In some embodiments, the cloud server 445 manages and maintains subscription services for the parking exit coordination.

The downloaded map is stored in the memory 420 that stores the map 425 (Step 510). The processor 410 analyzes the downloaded map and determines a location of the vehicle 100 in the parking structure (Step 520). At this time, the processor 410 receives data from the vehicle location detector 435 including the GPS system and the various sensing systems. In some embodiments, the processor 410 may communicate with the parking infrastructure system 460 as shown in FIG. 3 to determine the location of the vehicle 100. For instance, the various sensing systems may be associated with the parking infrastructure system 460 and provide relevant data or information as to the location of the vehicle 100 in the parking structure. The location of the vehicle 100 includes information indicating a floor level and a particular location with respect to one or more parking exit gates.

Once the location of the vehicle 100 is determined, localization of the vehicle 100 in the parking structure is performed. (Step 530). The localization of the vehicle 100 is explained in detail in connection with FIG. 5 below. As a result of the localization, a driver of the vehicle 100 receives an output that indicates a parking exit gate that the vehicle 100 is going to use (Step 540). As the vehicle 100 approaches the outputted parking exit gate, there may be other vehicles that plan to exit from the same parking exit gate. Then a turn of exiting the parking exit gate among two or more vehicles is determined. (Step 550).

Figure 5:
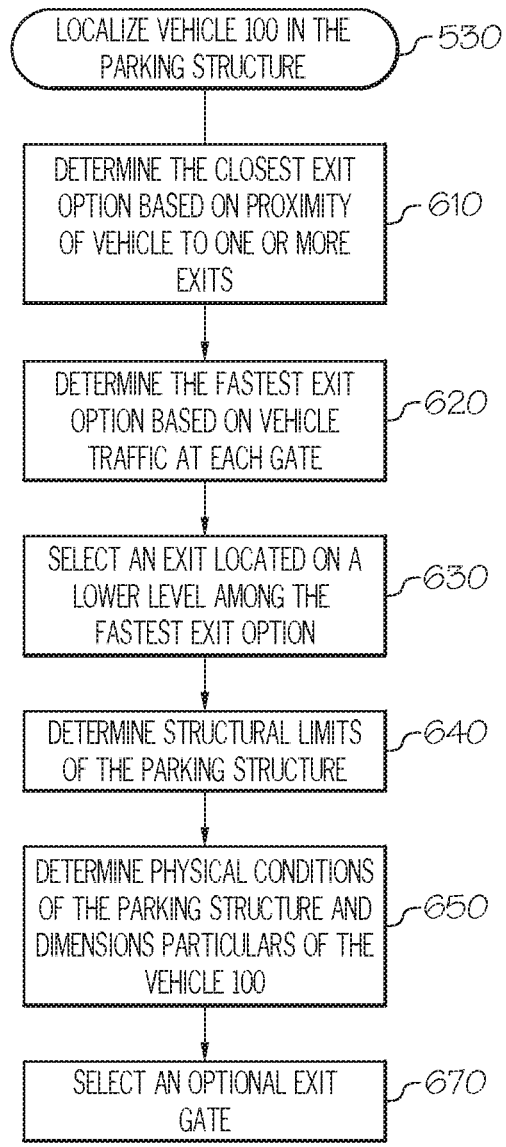
FIG. 5 depicts a flow chart of a method of localizing vehicles in a parking structure or a parking lot according to one or more embodiments shown and described herein.

Referring to FIG. 5, localization of the vehicle 100 (Step 530) is further explained. FIG. 5 depicts a flow chart of localization of vehicles in a parking structure or a parking lot according to one or more embodiments shown and described herein. In order to run the localization of vehicle, the memory 420 stores the parking exit coordination program 430. The localization of a vehicle may indicate evaluating multiple factors relevant to a particular parking structure with reference to the location of that vehicle in the particular parking structure. As a result, the localization of a vehicle will determine and output a parking exit gate that is the most suitable or desirable for a vehicle given the location of the vehicle in the parking structure and the multiple factors. In some embodiments, the multiple factors include proximity of the vehicle location to one or more parking exit gates, structural aspects of the parking structures such as columns, the presence and/or location of blocking structures, a height of a ceiling, orientation of an exit direction, one or more floor levels of the parking structures, etc. Additionally, or alternatively, the multiple factors further include structural aspects of vehicles. For example, if vehicles are large sized, then a parking exit gate having a larger and/or higher opening may be selected.

In other embodiments, the multiple factors include a driver's preference. For instance, one driver prefers the fastest route to exit a parking structure, and the other driver prefers the closest route to exit a parking structure even if the closest exit may be crowded. The fastest route may not be the closest if many vehicles try to exit a particular gate at that moment.

In some embodiments, the parking exit coordination program 430 may include a rule-based algorithm that applies a certain set of rules to determine a parking exit gate. The rule-based algorithm follows rules based on the multiple factors and the driver's preference discussed above. The rule-based algorithm further specifies the situations where multiple choices are available. More specifically, if two or more gates are selected based on the set of rules, then the rule-based algorithm further specifies a resulting exit gate out of two or more gates. For example, if two or more parking exit gates are competing, the rule-based algorithm may select and output a parking gate closest to the street level, or closest to the direction of a final destination of a driver.

In other embodiments, the parking exit coordination program 430 may include a machine learning program, a pattern recognition program, or a deep learning program. The parking exit coordination program 430 may develop and learn certain patterns of a driver or a vehicle in using and exiting parking structures.

Referring back to FIG. 5, localization includes determining the closest exit option by determining proximity of the vehicle 100 to one or more exit gates (Step 610). The localization further includes determining the fastest exit option by determining, for example, vehicle traffic at each exit gate (Step 620). In other embodiments, other factors that change the fastest exit option, such as ongoing construction, the presence of blocking structures, path type (e.g., a winding path, a steep path, etc.), may be considered. In some embodiments, the vehicle traffic may be determined by receiving one or more incoming broadcasting signals from surrounding vehicles. A distance may be preset such that surrounding vehicles may be limited to vehicles located within the preset distance from each exit gate. Additionally, or alternatively, a threshold as to a number of vehicles may be preset and it is checked whether or not the incoming broadcasting signals reach the preset number of vehicles.

In other embodiments, the vehicle 100 may receive the vehicle traffic information from the parking infrastructure system 460. The parking infrastructure system 460 may be continuously monitoring movement of vehicles at various floor levels. In addition, the parking infrastructure system 460 may particularly monitor the traffic state near the one or more exit gates. Accordingly, relevant traffic state information near the exit gates may be readily available with the parking infrastructure system. This communication option may be useful for vehicles not equipped with V2V communication.

In some embodiments, there may be one or more exit gates based on the fastest exit option criteria. In that case, an exit gate located on a lower level than other exit gates is selected (Step 630). The localization further includes determining structural limits of the parking structure (Step 640). For instance, the structural limits include blocking structures (e.g., fans, concrete columns, etc.) between the vehicle 100 and exit gates that require rotation, change of an orientation, etc. Another example of the structural limits may include winding passages, steep paths, lack of direct lanes, ongoing construction, etc. The localization further includes determining physical conditions of the parking structure (Step 650). For instance, the physical conditions include the dimensions of each exit gate. The localization also includes determining dimensions and particulars of the vehicle 100 (Step 650). For instance, if the vehicle 100 is a large size truck, it may be necessary to find an exit gate that can accommodate the dimensions of the vehicle 100. This localization factor may need to be considered accordingly.

Once the above localization factors are considered, then an optimal exit gate is selected. (Step 670). The localization factors discussed in connection with FIG. 5 are by example only and not limited to the factors as shown in FIG. 5. Moreover, parking structures may vary and localization factors relevant and customized to each parking structure can be added and considered. The parking exit coordination method described here can be modified to address and implement various localization factors required by the parking structures.

Figure 6:
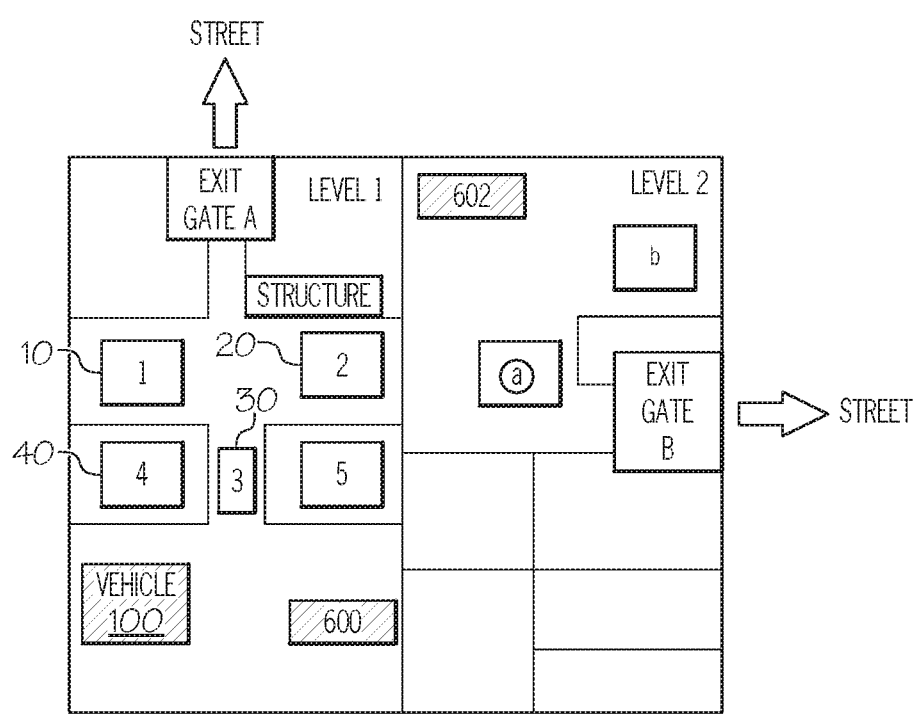
FIG. 6 depicts an exemplary display screen showing parking exit information according to one or more embodiments shown and described herein.

As a result of localization, the vehicle 100 selects an exit gate and approaches the exit gate as shown in Step 540 of FIG. 4. FIG. 6 depicts an exemplary display screen showing parking exit turns of vehicles. The display screen of FIG. 6 may be associated with a head unit of the vehicle 100 and displayed on a display panel of the head unit. As shown in FIG. 6, the vehicle 100 selects Exit Gate A by way of example. Along with the vehicle 100, there are multiple vehicles waiting to exit Exit Gate A. In FIG. 6, the multiple vehicles are shown with numbers. Vehicles 600 and 602 are driving around in the parking structure and trying to find an exit gate.

In some embodiments, the vehicle 100 is enabled with V2V communication and communicates with the multiple vehicles. Through the communication with multiple vehicles, the vehicle 100 may determine the congested state of Exit Gate A. In other embodiments, the vehicle 100 may communicate with the parking infrastructure system 460 (FIG. 3) in order to obtain information of the congested state of Exit Gate A.

As shown in FIG. 6, Exit Gate B on a different floor level may not be the closest parking exit gate, but Exit Gate B is less congested than Exit Gate A. Based on communication with other vehicles, and/or the parking infrastructure 460, the vehicle 100 may determine and readjust a parking exit gate option. Then, the localization factors may be calibrated based on such determination. For example, the parking exit coordination system 400 may determine whether a number of surrounding vehicles exceeds a predetermined threshold. Upon determination that there are more surrounding vehicles near Exit Gate A than the threshold, the parking exit coordination system 400 may calibrate the localization factors by excluding Exit Gate A and finding a second best option. In addition, the display screen as shown in FIG. 6 may prompt an option for changing the optimal exit gate to the different exit gate.

Figure 7:
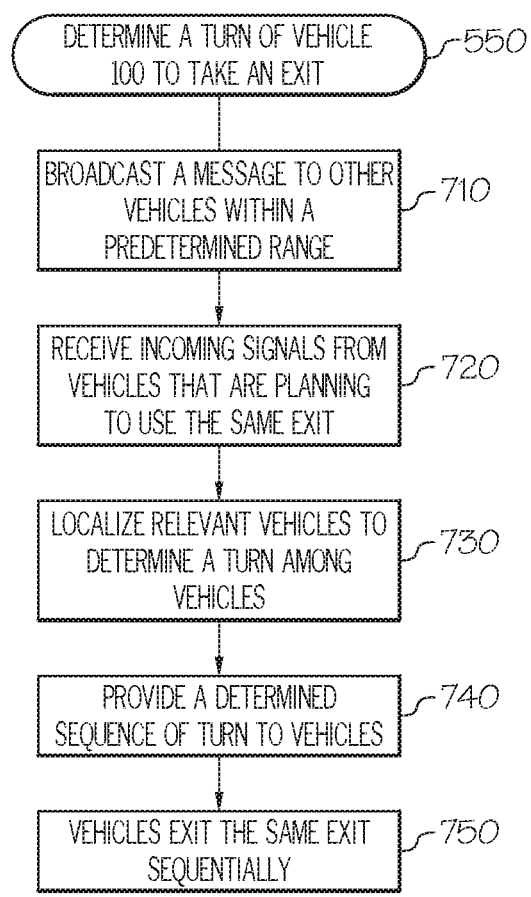
FIG. 7 depicts a flow chart of determining parking exit turns of vehicles according to one or more embodiments shown and described herein.

In FIG. 6, there is a plurality of surrounding vehicles near Exit Gate A on Level 1. On the display screen, a driver of the vehicle 100 can identify the surrounding vehicles and their turns to exit Exit Gate A. In some embodiments, the surrounding vehicles may be identified to the extent that these vehicles are arranged within a predetermined distance from Exit Gate A. This distance can be preset and stored in the memory 420 of the parking exit coordination system 400. Referring to FIG. 7, a method of determining a turn of the vehicle 100 and other vehicles near Exit Gate A is described.

FIG. 7 depicts a flow chart of determining parking exit turns of vehicles according to one or more embodiments shown and described herein. Once the optimal exit gate is determined, the vehicle 100 broadcasts that message to other surrounding vehicles 10, 20, 30, 40 and 50 within a predetermined range as shown in FIG. 6. (Step 710). The broadcasting signal sends out information indicative of selection of the optimal exit gate. The surrounding vehicles 10, 20, 30, 40 and 50 may be enabled with V2V communications and receive the broadcast signal from the vehicle 100. In addition, the surrounding vehicles 10, 20, 30, 40 and 50 may send broadcasting signals to the vehicle 100. The vehicle 100 receives one or more incoming broadcast signals from the surrounding vehicles 10, 20, 30, 40 and 50. (Step 720).

In some embodiments, the memory 420 (shown in FIG. 2) stores a predetermined localization program that determines a sequence of turns of the surrounding vehicles 10, 20, 30, 40 and 50 and the vehicle 100. The predetermined localization program is configured to localize the surrounding vehicles 10, 20, 30, 40 and 50 to determine a sequence of turns among the vehicles. (Step 730). The localization may consider multiple factors that are relevant to the surrounding vehicles 10, 20, 30, 40 and 50. For instance, the multiple factors include proximity between each of the surrounding vehicles 10, 20, 30, 40 and 50 and Exit Gate A. As another example, the multiple factors include ease of access to Exit Gate A. As shown in FIG. 6, the surrounding vehicle 20 is blocked by the structure of the parking facility. Then the localization program determines that the vehicle 10 proceeds first and the vehicle 20 proceeds even though proximity of the vehicle 10 and the vehicle 20 to Exit Gate A is identical or similar.

The multiple factors may further include orientation of the surrounding vehicles 10, 20, 30, 40 and 50. When two vehicles are located in approximately the same distance to Exit Gate A (FIG. 6), the localization program is configured to determine that a vehicle having the orientation that facilitates easy access to Exit Gate A should proceed first. Considering the multiple factors described above, a determined sequence of turns may be provided to the surrounding vehicles 10, 20, 30, 40 and 50. (Step 740).

In some embodiments, the determined sequence of turns is provided and output to the surrounding vehicles 10, 20, 30, 40 and 50. As shown in FIG. 6, drivers of the surrounding vehicles 10, 20, 30, 40 and 50 and the vehicle 100 view the recommended turns on the display screen. In other embodiments, the surrounding vehicles 10, 20, 30, 40 and 50 may be displayed in different colors and a vehicle having a first turn may be displayed with a flickering display.

In other embodiments, the parking infrastructure system 460 may stores the localization program that determines turns of the plurality of vehicles such as surrounding vehicles 10, 20, 30, 40 and 50 and the vehicle 100. Accordingly, vehicles having no V2V communication capability receive and access the determined sequence of turns. As discussed above, the parking infrastructure system 460 may seamlessly monitor and track the vehicle traffic within the parking structure. The parking infrastructures system 460 tracks the status of the surrounding vehicles 10, 20, 30, 40 and 50 and the vehicle 100 near Exit Gate A as shown in FIG. 6 and executes the localization program to determine relevant turns of each vehicle. Based on the determined turns, the vehicles 10, 20, 30, 40, 50 and 100 depart the parking facility through Exit Gate A sequentially. (Step 750).

As discussed in the embodiments described above, the parking exit coordination system and method may evaluate localization factors relevant to a parking facility and vehicles departing from a parking facility and determine an optimal exit gate that vehicles will use to depart from the parking facility. The parking exit coordination system and method described here involve vehicles enabled with various communication capabilities, the parking infrastructure system capable of communicating with vehicles within the parking facility, and a cloud server that communicates with the vehicles and the parking infrastructure. In some embodiments, the parking exit coordination system and method described here include a communication unit enabled with vehicle-to-vehicle (V2V) communication, vehicle-to-infrastructure (V2I) communication, vehicle-to-cloud (V2C) communication, or a combination thereof. The communication unit is in communication with respect to infrastructure of the target parking structure and operable to receive a set of data indicative of the current location of the target vehicle in the target parking structure and a number of surrounding vehicles that have selected the optimal exit gate.

In some embodiments, the parking exit coordination system and method described here include one or more processors and a memory storing computer codes of applying a predetermined set of rules to determine an optimal exit gate of a target parking structure. The predetermined set of rules include determining between the current location of the target vehicle and the one or more exit gates of the parking structure, determining a number of vehicles located within a predetermined threshold distance to the optimal exit gate and determining a fastest exit gate of the target parking structure, determining one or more localization factors associated with one or more exit gates of the parking structure, etc.

In some embodiments, the localization factors include a distance between the target vehicle and the one or more exit gates of the target parking structure; vehicle traffic adjacent to each of the exit gates within a predetermined threshold distance from the one or more parking exit gates; dimensions of the target vehicle; dimensions of the one or more exit gates of the selected target parking structure; an orientation of the target vehicle relative to the one or more exit gates; and one or more built-in structures of the selected target parking structure. Additionally, or alternatively, applying the predetermined set of rules further comprises retrieving user preference information stored in the memory. The user preference information prioritizes one or more of the localization factors.

In other embodiments, the parking exit coordination system and method may include computer code, upon execution by the one or more processors, for performing broadcasting selection of the optimal exit gate; receiving from surrounding vehicles one or more broadcasting signals indicative of selection of the optimal exit gate; determining whether a number of surrounding vehicles indicating selection of the optimal exit gate exceeds a predetermined threshold; and upon determination that the number of surrounding vehicles exceeds the predetermined threshold, determining whether or not to change the optimal exit gate of the target parking structure. The computer code further performs calibrating the localization factors based on the determination that the number of surrounding vehicles exceeds the predetermined threshold.

In yet another embodiment, a system for determining the motion of a vehicle relative to an exit gate of a structure includes a first group of sensors mounted on a target vehicle, a second group of sensors mounted on a target structure, a communication device mounted on the target vehicle and enabled with vehicle-to-vehicle (V2V) communication settings, vehicle-to-infrastructure (V2I) communication settings, vehicle-to-cloud (V2C) communication settings, or a combination thereof and a memory. The memory stores downloadable map data indicative of location coordinates of the target structure, computer code for correlating the location coordinates and a vehicle traffic state within the target structure with an orientation and a direction of the target vehicle relative to one or more exit gates of the target structure; and one or more processors. The one or more processors are adapted to receive signals from the first group of sensors and the second group of sensors; retrieve the location coordinates of the target structure; and execute the computer code. The one or more processors are configured to determine a current location of the target vehicle in the target structure; determine the orientation and direction of the target vehicle relative to one or more exit gates of the target structure; and select and output an optimal exit gate among the one or more exit gates.

In yet another embodiment, the memory further stores localization data indicative of one or more physical conditions of the target structure. The computer code further correlates the localization data with the orientation and the direction of the target vehicle relative to the one or more exit gates of the target structure. In other embodiments, the memory further stores computer code of calibrating the localization data and changing the optimal exit gate to a different exit gate; and the one or more processors are configured to prompt an option for changing the optimal exit gate to the different exit gate on a display screen.

In yet another embodiment, a method for determining motion of a vehicle relative to a closed structure includes steps of mounting a first group of sensors on a target vehicle; mounting a second group of sensors on a target structure; mounting a communication device on the target vehicle and enabled with vehicle-to-vehicle (V2V) communication settings, vehicle-to-infrastructure (V2I) communication settings, vehicle-to-cloud (V2C) communication settings, or a combination thereof; storing in a memory: downloadable data indicative of location coordinates of the target structure; computer code of correlating the location coordinates and a traffic state within the target structure with an orientation and a direction of the target vehicle; executing the computer code, with one or more processors: receiving signals from the first group of sensors and the second group of sensors; retrieving the location coordinates of the target structure; determining a current location of the target vehicle in the target structure; and determining the orientation and direction of the target vehicle relative to one or more departure gates of the target structure.

In yet another embodiment, the method for determining the motion of the vehicle further includes storing in the memory localization data indicative of one or more physical conditions of the target structure and correlating the localization data with the orientation and the direction of the target vehicle relative to the one or more departure gates of the target structure.

In yet another embodiment, the method for determining the motion of the vehicle further includes outputting a selected departure gate on a display screen; broadcasting the selected departure gate via a V2V communication channel and a V2I communication channel; and receiving one or more incoming broadcasting signals indicative of selection of the selected exit gate. In yet another embodiment, the method for determining the motion of the vehicle further includes calibrating the orientation and the direction of the target vehicle relative to the selected departure gate based on the one or more incoming broadcasting signals.

In yet another embodiment, the method for determining the motion of the vehicle further includes outputting on the display screen surrounding vehicles that have sent the one or more incoming broadcasting signals indicative of selection of the selected exit gate. The method for determining the motion of the vehicle further includes determining a departure sequence of vehicles including the target vehicle and surrounding vehicles that have sent the one or more incoming broadcasting signals.

In yet another embodiment, the method for determining the motion of the vehicle further includes outputting on the display screen the target vehicle and the surrounding vehicles associated with the departure sequence.

In yet another embodiment, a method for determining motion of a vehicle relative to a closed structure includes steps of retrieving map data indicative of location coordinates of a target structure from a memory, correlating the location coordinates and a traffic state within the target structure with an orientation and a direction of a target vehicle, determining a current location of the target vehicle in the target structure based on output from one or more sensors, a GPS signal, or both, determining the orientation and direction of the target vehicle relative to one or more exit gates of the target structure, and selecting and outputting an optimal exit gate among the one or more exit gates.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
a first set of machine readable instructions stored in one or more memories that, upon execution by one or more processors, perform at least the following:
receiving location information of a target vehicle from a vehicle location detector;
determining a current location of the target vehicle in a target parking structure based at least in part on a parking location reference point locator;
retrieving user preference information that prioritizes among:

first data stored in the one or more memories comprising a distance between the target vehicle and one or more exit gates of the target parking structure;

second data stored in the one or more memories comprising vehicle traffic adjacent to each of the one or more exit gates within a predetermined threshold distance from the one or more exit gates; and determining an optimal exit gate based upon the prioritized user preference information; and outputting the optimal exit gate on a display screen.

2. The system of claim 1, further comprising determining proximity between the current location of the target vehicle and the one or more exit gates of the target parking structure to determine the optimal exit gate.

3. The system of claim 1, further comprising:
determining a number of vehicles located within a predetermined threshold distance to the optimal exit gate; and
determining a fastest exit gate of the target parking structure.

4. The system of claim 1, further comprising determining one or more localization factors associated with one or more exit gates of the target parking structure to determine the optimal exit gate.

5. The system of claim 4, wherein the one or more localization factors comprises one or more of:
a distance between the target vehicle and the one or more exit gates of the target parking structure;
vehicle traffic adjacent to each of the one or more exit gates within a predetermined threshold distance from the one or more exit gates;
dimensions of the target vehicle;
dimensions of the one or more exit gates of the target parking structure;
an orientation of the target vehicle relative to the one or more exit gates; and
one or more built-in structures of the target parking structure.

6. The system of claim 5, further comprising retrieving user preference information stored in the one or more memories wherein the user preference information prioritizes one or more of the localization factors.

7. The system of claim 1, further comprising a second set of machine readable instructions stored in the one or more memories, that upon execution by the one or more processors, perform at least the following:
broadcasting a selection of the optimal exit gate;
receiving from surrounding vehicles one or more broadcasting signals indicative of selection of the optimal exit gate;
determining whether a number of surrounding vehicles indicating selection of the optimal exit gate exceeds a predetermined threshold; and
upon determination that the number of surrounding vehicles exceeds the predetermined threshold, determining whether or not to change the optimal exit gate of the target parking structure.

8. The system of claim 7, further comprising determining one or more localization factors associated with one or more exit gates of the target parking structure to determine the optimal exit gate; and
wherein the second set of machine readable instructions further performs:
calibrating the localization factors based on the determination that the number of surrounding vehicles exceeds the predetermined threshold.

9. The system of claim 1, further comprising a second set of machine readable instructions stored in the one or more memories, that upon execution by the one or more processors, perform at least the following:
broadcasting a selection of the optimal exit gate according to vehicle-to-vehicle (V2V) communication settings, vehicle-to-infrastructure (V2I) communication settings, vehicle-to-cloud (V2C) communication settings, or a combination thereof.

10. The system of claim 9, wherein the second set of machine readable instructions, upon execution by the one or more processors, further performs at least the following:
receiving, from infrastructure of the target parking structure, a set of data indicative of the current location of the target vehicle in the target parking structure and a number of surrounding vehicles that have selected the optimal exit gate.

11. A system comprising:
one or more processors coupled to memory and configured to:
receive signals from a first group of sensors mounted on a target vehicle and a second group of sensors mounted on a target structure;
retrieve location coordinates of the target structure;
determine a current location of the target vehicle in the target structure;
determine an orientation and direction of the target vehicle relative to one or more exit gates of the target structure; and
select and output an optimal exit gate among the one or more exit gates based on user preferences information that prioritizes among first data stored in the one or more memories comprising an orientation direction of an exit and second data stored in the one or more memories comprising a level of an exit within the target structure.

12. The system of claim 11, wherein the memory stores localization data indicative of one or more physical conditions of the target structure; and
computer code further correlates the localization data with the orientation and the direction of the target vehicle relative to the one or more exit gates of the target structure.

13. The system of claim 12, wherein the memory further stores computer code for calibrating the localization data and changing the optimal exit gate to a different exit gate; and
the one or more processors are configured to prompt an option for changing the optimal exit gate to the different exit gate on a display screen.

14. A method comprising:
retrieving map data indicative of location coordinates of a target structure from a memory;
correlating the location coordinates and a vehicle traffic state within the target structure with an orientation and a direction of a target vehicle relative to one or more exit gates of the target structure;
determining a current location of the target vehicle in the target structure based on output from one or more sensors, a GPS signal, or both;
determining an orientation and direction of the target vehicle relative to the one or more exit gates of the target structure based at least in part on a parking location reference point locator, wherein the parking location reference point locator includes an image capturing device that operatively captures images within the target structure; and selecting and outputting an optimal exit gate among the one or more exit gates based on user preferences information that prioritizes among first data comprising an orientation direction of an exit and second data comprising a level of an exit within the target structure.

15. The method of claim 14, further comprising:

storing localization data indicative of one or more physical conditions of the target structure; and correlating the localization data with the orientation and the direction of the target vehicle relative to the one or more exit gates of the target structure.

16. The method of claim 14, further comprising:

outputting the optimal exit gate as a selected exit gate on a display screen;

broadcasting the selected exit gate via a V2V communication channel and a V2I communication channel; and receiving one or more incoming broadcasting signals indicative of a selection of the selected exit gate.

17. The method of claim 16, further comprising:

calibrating the orientation and the direction of the target vehicle relative to the selected exit gate based on the one or more incoming broadcasting signals.

18. The method of claim 16, further comprising:

outputting on the display screen surrounding vehicles that have sent the one or more incoming broadcasting signals indicative of the selection of the selected exit gate.

19. The method of claim 16, further comprising:

determining a departure sequence of vehicles including the target vehicle and surrounding vehicles that have sent the one or more incoming broadcasting signals.

20. The method of claim 19, further comprising:

outputting on the display screen the target vehicle and the surrounding vehicles associated with the departure sequence; and outputting on the display screen an indication of the departure sequence.

* * * * *